(12) United States Patent
Hendel et al.

(10) Patent No.: US 12,033,422 B1
(45) Date of Patent: Jul. 9, 2024

(54) ULTRASONIC FINGERPRINT ANTI-SPOOFING BASED ON A-LINE DATA

(71) Applicant: QUALCOMM Incorporated, San Diego, CA (US)

(72) Inventors: Adi Hendel, Giv'atayim (IL); Nathan Altman, San Diego, CA (US); Bence Major, Amsterdam (NL); Javier Frydman, Tel-Mond (IL); Hasib Siddiqui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/186,865

(22) Filed: Mar. 20, 2023

(51) Int. Cl.
```
G06K 9/00      (2022.01)
G06F 21/32     (2013.01)
G06V 10/82     (2022.01)
G06V 40/12     (2022.01)
G06V 40/13     (2022.01)
G06V 40/40     (2022.01)
G06V 40/50     (2022.01)
```

(52) U.S. Cl.
CPC .......... *G06V 40/1306* (2022.01); *G06F 21/32* (2013.01); *G06V 10/82* (2022.01); *G06V 40/1376* (2022.01); *G06V 40/45* (2022.01); *G06V 40/50* (2022.01)

(58) Field of Classification Search
CPC .......... G06V 40/1306; G06V 40/1376; G06V 10/82; G06V 40/50; G06V 40/45; G06V 40/1394; G06V 40/1365; G06V 40/1382; G06F 21/32

USPC ......................................................... 382/124
See application file for complete search history.

(56) References Cited

U.S. PATENT DOCUMENTS

| | | | |
|---|---|---|---|
| 11,062,010 B2 | 7/2021 | Yoon et al. | |
| 2017/0231534 A1* | 8/2017 | Agassy | G06V 40/1382 382/124 |
| 2018/0129849 A1* | 5/2018 | Strohmann | G06V 40/1394 |
| 2021/0133424 A1* | 5/2021 | Sohn | G06V 40/1365 |
| 2021/0150239 A1 | 5/2021 | Yoon et al. | |
| 2022/0327189 A1 | 10/2022 | Belli et al. | |

* cited by examiner

*Primary Examiner* — Abdul-Samad A Adediran
(74) *Attorney, Agent, or Firm* — QUALCOMM Incorporated

(57) ABSTRACT

Some disclosed methods involve obtaining current A-line data corresponding to reflections of ultrasonic waves from a target object detected by a single receiver pixel, obtaining current ultrasonic fingerprint image data corresponding to reflections of ultrasonic waves from a target object surface, obtaining previously-obtained A-line data that was previously obtained from an authorized user, and obtaining previously-obtained ultrasonic fingerprint image data that was previously obtained from the authorized user. Some disclosed methods involve estimating, based at least in part on the current A-line data, the previously-obtained A-line data, the current ultrasonic fingerprint image data and the previously-obtained ultrasonic fingerprint image data, whether the target object is a finger of the authorized user. The estimation may involve an anti-spoofing process based at least in part on the current A-line data and the previously-obtained A-line data.

20 Claims, 7 Drawing Sheets

ULTRASONIC FINGERPRINT
ANTI-SPOOFING BASED ON A-LINE DATA

TECHNICAL FIELD

This disclosure relates generally to ultrasonic fingerprint sensor systems and relates more specifically to spoof detection and prevention for devices that include ultrasonic fingerprint sensor systems.

DESCRIPTION OF THE RELATED TECHNOLOGY

Biometric authentication can be an important feature for controlling access to devices, etc. Many existing products include some type of biometric authentication, including but not limited to fingerprint-based authentication. Although some existing fingerprint-based authentication methods and devices can provide satisfactory performance, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include an ultrasonic fingerprint sensor system and a control system configured for communication with the ultrasonic fingerprint sensor system. The ultrasonic fingerprint sensor system may include a plurality of receiver pixels. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. In some implementations, a mobile device (such as a wearable device, a cellular telephone, etc.) may be, or may include, at least part of the apparatus.

According to some examples, the control system may be configured to control the ultrasonic fingerprint sensor system to obtain current A-line data from a target object on an outside surface of the apparatus. In some examples, the current A-line data may be, or may include, fingerprint sensor data corresponding to reflections of ultrasonic waves from the target object detected by a single receiver pixel or by a cluster of adjacent receiver pixels. In some examples, the control system may be configured to control the ultrasonic fingerprint sensor system to obtain current ultrasonic fingerprint image data corresponding to reflections of ultrasonic waves from a target object surface. According to some examples, the control system may be configured to obtain, from a memory, previously-obtained A-line data. The previously-obtained A-line data may have previously been obtained by the ultrasonic fingerprint sensor system and from an authorized user.

In some examples, the control system may be configured to obtain, from a memory, previously-obtained ultrasonic fingerprint image data. The previously-obtained ultrasonic fingerprint image data may have previously been obtained by the ultrasonic fingerprint sensor system and from the authorized user. According to some examples, the control system may be configured to estimate, based at least in part on the current A-line data, the previously-obtained A-line data, the current ultrasonic fingerprint image data and the previously-obtained ultrasonic fingerprint image data, whether the target object is a finger of the authorized user.

In some examples, estimating whether the target object is a finger of the authorized user may involve a fingerprint authentication process based at least in part on the current ultrasonic fingerprint image data and the previously-obtained ultrasonic fingerprint image data.

According to some examples, estimating whether the target object is a finger of the authorized user may involve an anti-spoofing process. In some examples, the control system may be configured to implement one or more neural networks configured to perform the anti-spoofing process. According to some examples, the one or more neural networks may include a deep neural network (DNN). In some examples, the one or more neural networks may include a plurality of multilayer perceptron (MLPs), each of which may be configured to provide output features to the DNN corresponding to a frame of current A-line data and a frame of previously-obtained A-line data.

In some examples, the control system may be configured to determine the current A-line features and the previously-obtained A-line features based, at least in part, on output of a singular value decomposition (SVD) process. According to some examples, inputs to the SVD process may include A-line data corresponding to a plurality of different materials. In some examples, inputs to the SVD process may include A-line data obtained when each material of the plurality of different materials was at a plurality of different temperatures.

According to some examples, the previously-obtained A-line data may include enrollment A-line data. The enrollment A-line data may have previously been obtained by the ultrasonic fingerprint sensor system and from the authorized user during a user enrollment process. In some examples, the previously-obtained ultrasonic fingerprint image data may include enrollment ultrasonic fingerprint image data. The enrollment ultrasonic fingerprint image data may have previously been obtained by the ultrasonic fingerprint sensor system and from the authorized user during a user enrollment process.

In some examples, the previously-obtained A-line data may correspond with the previously-obtained ultrasonic fingerprint image data. According to some examples, the previously-obtained A-line data may have been obtained when the previously-obtained ultrasonic fingerprint image data were obtained.

Other innovative aspects of the subject matter described in this disclosure may be implemented in a method. In some examples, the method may involve controlling, by a control system, an ultrasonic fingerprint sensor system to obtain current A-line data from a target object on an outside surface of an apparatus that includes the ultrasonic fingerprint sensor system. The current A-line data may include fingerprint sensor data corresponding to reflections of ultrasonic waves from the target object detected by a single receiver pixel or by a cluster of adjacent receiver pixels. In some examples, the method may involve controlling, by the control system, the ultrasonic fingerprint sensor system to obtain current ultrasonic fingerprint image data corresponding to reflections of ultrasonic waves from a target object surface.

According to some examples, the method may involve obtaining, by the control system and from a memory, previously-obtained A-line data. The previously-obtained A-line data may have previously been obtained by the ultrasonic fingerprint sensor system and from an authorized user. In some examples, the method may involve obtaining, by the control system and from a memory, previously-obtained ultrasonic fingerprint image data The previously-obtained ultrasonic fingerprint image data may have previously been obtained by the ultrasonic fingerprint sensor system and from the authorized user. According to some examples, the method may involve estimating, by the control system and based at least in part on the current A-line data, the previously-obtained A-line data, the current ultrasonic fingerprint image data and the previously-obtained ultrasonic fingerprint image data, whether the target object is a finger of the authorized user.

In some examples, wherein estimating whether the target object is a finger of the authorized user may involve a fingerprint authentication process based at least in part on the current ultrasonic fingerprint image data and the previously-obtained ultrasonic fingerprint image data.

According to some examples, estimating whether the target object is a finger of the authorized user may involve an anti-spoofing process. In some examples, the control system may be configured to implement one or more neural networks configured to perform the anti-spoofing process. According to some examples, the one or more neural networks may include a deep neural network (DNN). In some examples, According to some examples, the one or more neural networks include a plurality of multilayer perceptron (MLPs), each of which may be configured to provide output features to the DNN corresponding to a frame of current A-line data and a frame of previously-obtained A-line data.

In some examples, the method may involve determining current A-line features corresponding to frames of current A-line data and previously-obtained A-line features corresponding to frames of previously-obtained A-line data. According to some examples, the method may involve determining the current A-line features and the previously-obtained A-line features based, at least in part, on output of a singular value decomposition (SVD) process. In some examples, inputs to the SVD process may include A-line data corresponding to a plurality of different materials. According to some examples, inputs to the SVD process may include A-line data obtained when each material of the plurality of different materials was at a plurality of different temperatures.

In some examples, the previously-obtained A-line data may include enrollment A-line data. The enrollment A-line data may have previously been obtained by the ultrasonic fingerprint sensor system and from the authorized user during a user enrollment process.

According to some examples, the previously-obtained ultrasonic fingerprint image data may include enrollment ultrasonic fingerprint image data. The enrollment ultrasonic fingerprint image data may have previously been obtained by the ultrasonic fingerprint sensor system and from the authorized user during a user enrollment process.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method. According to some examples, the method may involve controlling, by a control system, an ultrasonic fingerprint sensor system to obtain current A-line data from a target object on an outside surface of an apparatus that includes the ultrasonic fingerprint sensor system. The current A-line data may include fingerprint sensor data corresponding to reflections of ultrasonic waves from the target object detected by a single receiver pixel or by a cluster of adjacent receiver pixels. In some examples, the method may involve controlling, by the control system, the ultrasonic fingerprint sensor system to obtain current ultrasonic fingerprint image data corresponding to reflections of ultrasonic waves from a target object surface.

According to some examples, the method may involve obtaining, by the control system and from a memory, previously-obtained A-line data. The previously-obtained A-line data may have previously been obtained by the ultrasonic fingerprint sensor system and from an authorized user. In some examples, the method may involve obtaining, by the control system and from a memory, previously-obtained ultrasonic fingerprint image data The previously-obtained ultrasonic fingerprint image data may have previously been obtained by the ultrasonic fingerprint sensor system and from the authorized user. According to some examples, the method may involve estimating, by the control system and based at least in part on the current A-line data, the previously-obtained A-line data, the current ultrasonic fingerprint image data and the previously-obtained ultrasonic fingerprint image data, whether the target object is a finger of the authorized user.

In some examples, wherein estimating whether the target object is a finger of the authorized user may involve a fingerprint authentication process based at least in part on the current ultrasonic fingerprint image data and the previously-obtained ultrasonic fingerprint image data.

According to some examples, estimating whether the target object is a finger of the authorized user may involve an anti-spoofing process. In some examples, the control system may be configured to implement one or more neural networks configured to perform the anti-spoofing process. According to some examples, the one or more neural networks may include a deep neural network (DNN). In some examples, According to some examples, the one or more neural networks include a plurality of multilayer perceptron (MLPs), each of which may be configured to provide output features to the DNN corresponding to a frame of current A-line data and a frame of previously-obtained A-line data.

In some examples, the method may involve determining current A-line features corresponding to frames of current A-line data and previously-obtained A-line features corresponding to frames of previously-obtained A-line data. According to some examples, the method may involve determining the current A-line features and the previously-obtained A-line features based, at least in part, on output of a singular value decomposition (SVD) process. In some examples, inputs to the SVD process may include A-line data corresponding to a plurality of different materials. According to some examples, inputs to the SVD process may include A-line data obtained when each material of the plurality of different materials was at a plurality of different temperatures.

In some examples, the previously-obtained A-line data may include enrollment A-line data. The enrollment A-line data may have previously been obtained by the ultrasonic fingerprint sensor system and from the authorized user during a user enrollment process.

According to some examples, the previously-obtained ultrasonic fingerprint image data may include enrollment ultrasonic fingerprint image data. The enrollment ultrasonic fingerprint image data may have previously been obtained by the ultrasonic fingerprint sensor system and from the authorized user during a user enrollment process.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1A:
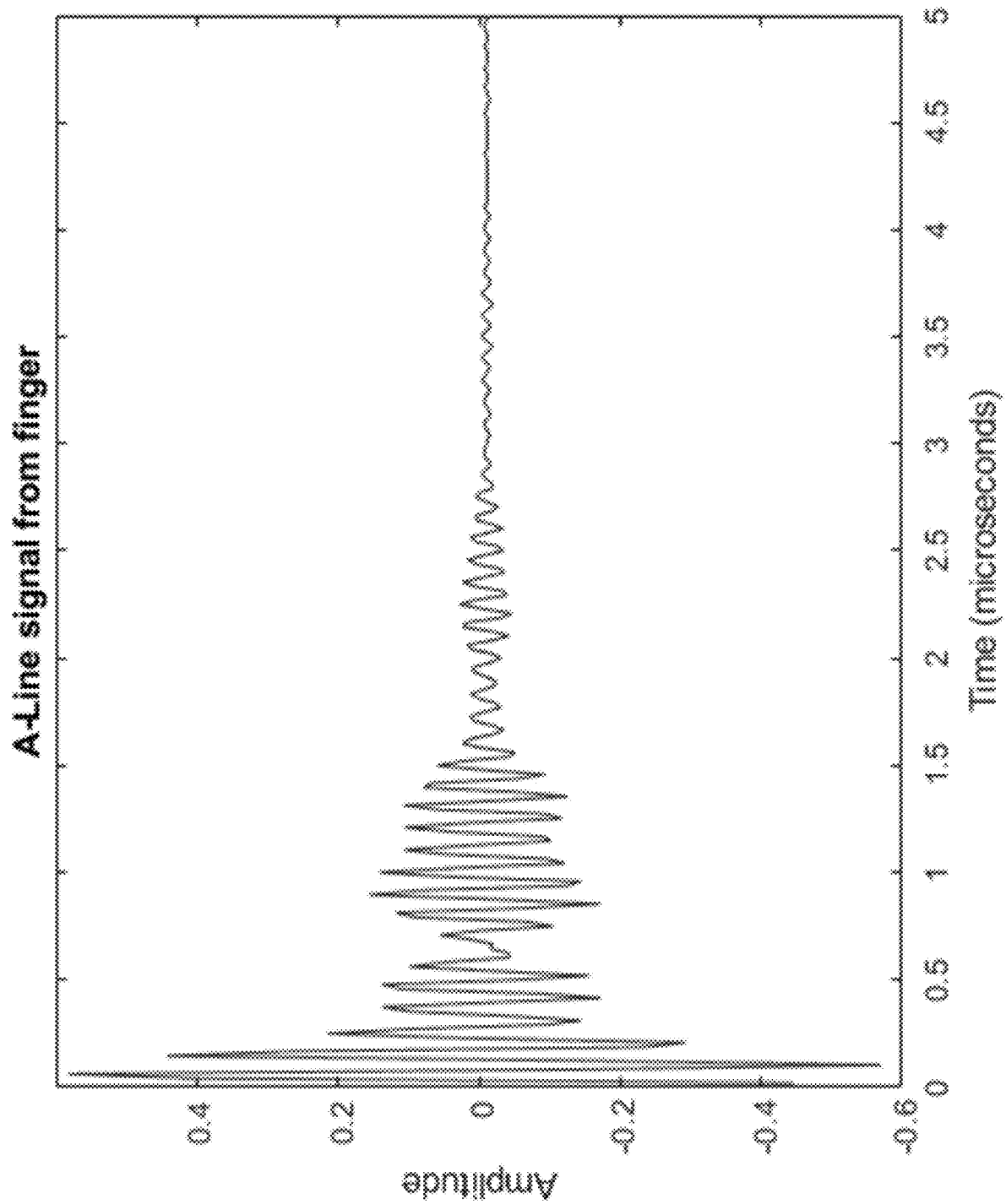
FIGS. 1A and 1B show examples of A-line data.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Many devices, including but not limited to mobile devices such as cellular telephones, are configured to implement fingerprint-based authentication. Technically savvy hackers have proven to be skilled in creating objects sometimes referred to as "spoofs," which have a fingerprint pattern that matches a fingerprint pattern of an authorized user, in order to provide unauthorized access to such devices. The process of using a spoof is sometimes referred to as "spoofing." In some instances, spoofing may involve using a finger-like object that includes silicone rubber, polyvinyl acetate (white glue), gelatin, glycerin, etc., with a fingerprint pattern of a rightful user formed on an outside surface. In some cases, a hacker may form a fingerprint pattern of an authorized user on a sleeve or partial sleeve that can be slipped over or on the hacker's finger.

Some methods disclosed herein—including but not limited to anti-spoofing methods—are based, at least in part, on what is sometimes referred to as "A-line data." A-line data is fingerprint sensor data corresponding to reflections of ultrasonic waves from a target object that are detected by a single receiver pixel, or by a cluster of adjacent receiver pixels. In order to obtain fingerprint image data, signals from an ultrasonic receiver array are normally sampled during a relatively narrow time window corresponding to reflections from ridges and valleys of a fingerprint, which may be approximately one hundred nanoseconds in some examples. In contrast to the process of obtaining fingerprint image data, A-line data is normally during a much longer time interval, which may be on the order of tens of microseconds. Accordingly, A-line data of a person's finger includes reflections from sub-epidermal features, such as blood vessels, features of the dermis, muscle tissue, bone, etc. Therefore, A-line data of a person's finger includes personalized information regarding that person's sub-epidermal features.

Some disclosed methods involve obtaining current A-line data and current ultrasonic fingerprint image data corresponding to reflections of ultrasonic waves from a target object, for example during a fingerprint authentication process. Some such methods involve obtaining, from a memory, previously-obtained A-line data and previously-obtained ultrasonic fingerprint image data that were previously obtained from an authorized user, for example during a fingerprint enrollment process. Some disclosed methods involve estimating, based at least in part on the current A-line data, the previously-obtained A-line data, the current ultrasonic fingerprint image data and the previously-obtained ultrasonic fingerprint image data, whether the target object is a finger of the authorized user. The estimation may, in some examples, involve an anti-spoofing process based at least in part on the current A-line data and the previously-obtained A-line data. The estimation may involve a fingerprint authentication process based at least in part on the current ultrasonic fingerprint image data and the previously-obtained ultrasonic fingerprint image data. The A-line data may include information about material through which the corresponding ultrasonic waves have traveled, in addition to information corresponding to sub-epidermal features of a finger.

Particular aspects of the subject matter described in this disclosure may be implemented to realize one or more of the following potential advantages. As noted above, some spoofing techniques are based on forming fingerprint-like features on an object, which may be a finger-like object. However, making a finger-like object with detailed features that would accurately correspond with sub-epidermal features of an authorized user would be extremely challenging. Accordingly, the disclosed anti-spoofing examples can provide a higher level of confidence that a target object having a fingerprint pattern that matches a fingerprint pattern of an authorized user is actually the authorized user's finger. Some disclosed examples involving the use of A-line data from previous match attempts can provide an improved false acceptance ratio (FAR), which corresponds to instances in which a fingerprint match is determined when the matching fingerprint is not obtained from an authorized user's finger. Some disclosed methods involve finger detection and device activation based on A-line data, for example when a touch sensor system is in a low-power or "sleep" mode.

Figure 1B:
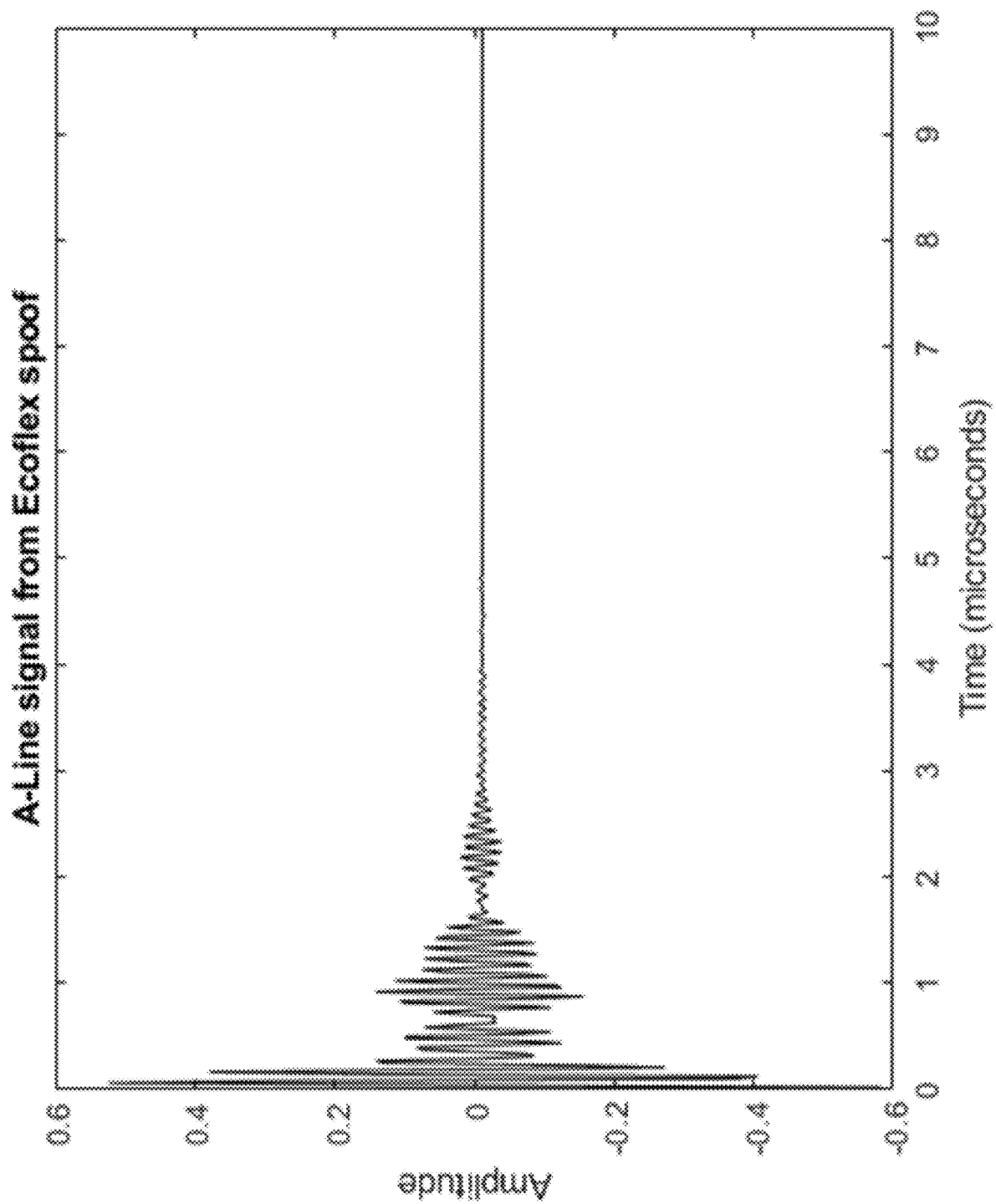

FIGS. 1A and 1B show examples of A-line data. The A-line data shown in FIGS. 1A and 1B are represented as graphs of reflection amplitude versus time. In these examples, the A-line data was obtained by summing the signals from all of the individual ultrasonic receiver pixels of an ultrasonic receiver pixel array, to form a time/amplitude curve. In some alternative examples, the A-line data may be obtained from a single ultrasonic receiver pixel, or from a cluster of adjacent ultrasonic receiver pixels (such as 2 pixels, 4 pixels, 6 pixels, 8 pixels, etc).

The relatively high-amplitude events shown in FIG. 1A indicate reflections from within a target object, which was a finger in this example, caused by acoustic impedance contrast within the target object. The surface of a bone, for example, generally has a relatively high acoustic impedance contrast with the overlying tissue and therefore produces a relatively high-amplitude reflection. The presence of such reflections, in conjunction with a fingerprint match, would suggest that the target object is actually a finger of an authorized user. However, the anti-spoofing examples disclosed herein can provide a higher level of confidence that the target object is not a spoof.

FIG. 1B shows an example of an A-line signal obtained from an artificial, finger-like "spoof." According to this example, the spoof includes Ecoflex™ material. In this example, the spoof has been manufactured to include materials having sufficient acoustic impedance contrasts to cause reflections from within the spoof. This example provides evidence that the mere presence of subsurface reflections does not provide conclusive evidence as to whether a target object is a spoof.

Figure 1C:
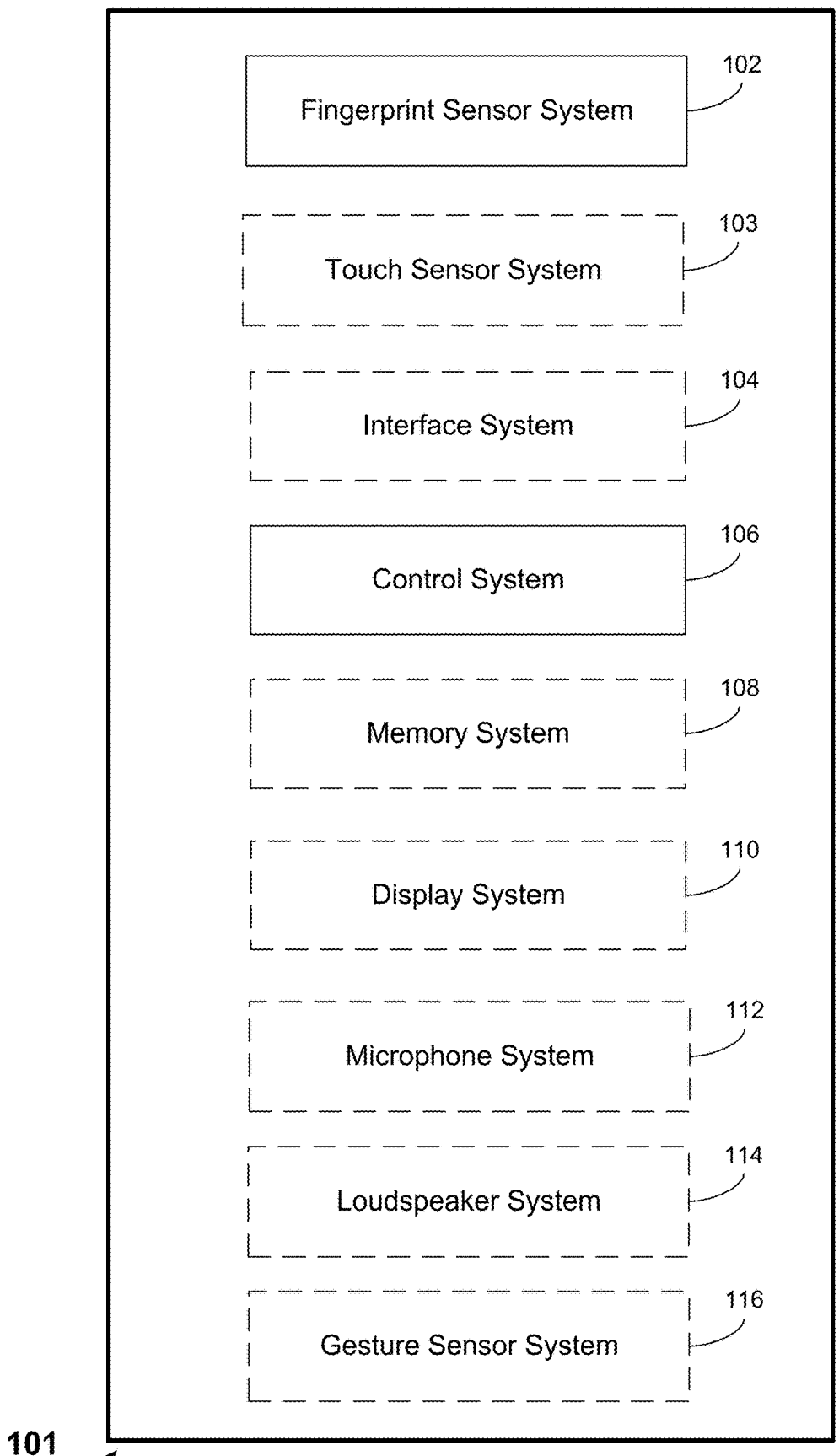
FIG. 1C is a block diagram that shows example components of an apparatus according to some disclosed implementations.

FIG. 1C is a block diagram that shows example components of an apparatus according to some disclosed implementations. In this example, the apparatus 101 includes a fingerprint sensor system 102 and a control system 106. Some implementations may include a touch sensor system 103, an interface system 104, a memory system 108, a display system 110, a microphone system 112, a loudspeaker system 114, a gesture sensor system 116, or combinations thereof.

In this example, the fingerprint sensor system 102 is, or includes, an ultrasonic fingerprint sensor system. In some implementations the fingerprint sensor system 102 also may include another type of fingerprint sensor, such as an optical fingerprint sensor, a capacitive fingerprint sensor, a thermal fingerprint sensor, etc. In some examples, the ultrasonic fingerprint sensor system may include an ultrasonic receiver and a separate ultrasonic transmitter. In some such examples, the ultrasonic transmitter may include an ultrasonic plane-wave generator. However, various examples of ultrasonic fingerprint sensors are disclosed herein, some of which may include a separate ultrasonic transmitter and some of which may not. For example, in some implementations, the fingerprint sensor system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. The fingerprint sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

Data received from the fingerprint sensor system 102 may sometimes be referred to herein as "fingerprint sensor data," "fingerprint image data," etc., whether or not the received data corresponds to an actual digit or another object from which the fingerprint sensor system 102 has received data. Such data will generally be received from the fingerprint sensor system in the form of electrical signals. Accordingly, without additional processing such image data would not necessarily be perceivable by a human being as an image. As noted elsewhere herein, the word "finger" as used herein may correspond to any digit, including a thumb. Accordingly, a thumbprint is a type of fingerprint.

The optional touch sensor system 103 may be, or may include, a resistive touch sensor system, a surface capacitive touch sensor system, a projected capacitive touch sensor system, a surface acoustic wave touch sensor system, an infrared touch sensor system, or any other suitable type of touch sensor system. In some implementations, the area of the touch sensor system 103 may extend over most or all of a display portion of the display system 110.

In some examples, the interface system 104 may include a wireless interface system. In some implementations, the interface system 104 may include a user interface system, one or more network interfaces, one or more interfaces between the control system 106 and the fingerprint sensor system 102, one or more interfaces between the control system 106 and the touch sensor system 103, one or more interfaces between the control system 106 and the memory system 108, one or more interfaces between the control system 106 and the display system 110, one or more interfaces between the control system 106 and the microphone system 112, one or more interfaces between the control system 106 and the loudspeaker system 114, one or more interfaces between the control system 106 and the gesture sensor system 116 and/or one or more interfaces between the control system 106 and one or more external device interfaces (e.g., ports or applications processors).

The interface system 104 may be configured to provide communication (which may include wired or wireless communication, electrical communication, radio communication, etc.) between components of the apparatus 101. In some such examples, the interface system 104 may be configured to provide communication between the control system 106 and the fingerprint sensor system 102. According to some such examples, the interface system 104 may couple at least a portion of the control system 106 to the fingerprint sensor system 102 and the interface system 104 may couple at least a portion of the control system 106 to the touch sensor system 103, e.g., via electrically conducting material (e.g., via conductive metal wires or traces. According to some examples, the interface system 104 may be configured to provide communication between the apparatus 101 and other devices and/or human beings. In some such examples, the display system 110, the microphone system 112, the loudspeaker system 114, the gesture sensor system 116, or combinations thereof may be considered to be components of the interface system 104, even though these components are shown as separate blocks in FIG. 2. In some examples, the interface system 104 may include one or more user interfaces, haptic feedback devices, etc. The interface system 104 may, in some examples, include one or more network interfaces and/or one or more external device interfaces (such as one or more universal serial bus (USB) interfaces or a serial peripheral interface (SPI)).

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 also may include one or more memory devices, such as one or more random access memory (RAM) devices, read-only memory (ROM) devices, etc. In this example, the control system 106 is configured for communication with, and for controlling, the fingerprint sensor system 102. In implementations wherein the apparatus includes a touch sensor system 103, the control system 106 may be configured for communication with, and for controlling, the touch sensor system 103. In implementations wherein the apparatus includes a memory system 108 that is separate from the control system 106, the control system 106 also may be configured for communication with the memory system 108. In implementations wherein the apparatus includes a display system 110, the control system 106 may be configured for communication with, and for controlling, the display system 110. In implementations wherein the apparatus includes a microphone system 112, the control system 106 may be configured for communication with, and for controlling, the microphone system 112. In implementations wherein the apparatus includes an loudspeaker system 114, the control system 106 may be configured for communication with, and for controlling, the loudspeaker system 114. According to some examples, the control system 106 may include one or more dedicated components that are configured for controlling the fingerprint sensor system 102, the touch sensor system 103, the memory system 108, the display system 110, the microphone system 112 and/or the loudspeaker system 114.

Accordingly, some examples of the apparatus 101 may include dedicated components that are configured for controlling at least a portion of the fingerprint sensor system 102, for processing fingerprint image data received from the fingerprint sensor system 102, or combinations thereof. Although the control system 106 and the fingerprint sensor system 102 are shown as separate components in FIG. 1C, in some implementations at least a portion of the control system 106 and at least a portion of the fingerprint sensor system 102 may be co-located. For example, in some implementations one or more components of the fingerprint sensor system 102 may reside on an integrated circuit or "chip" of the control system 106. According to some implementations, functionality of the control system 106 may be partitioned between one or more controllers or processors, such as between a dedicated sensor controller and an applications processor (also referred to herein as a "host" processor) of an apparatus, such as a host processor of a mobile device. In some such implementations, at least a portion of the host processor may be configured for fingerprint image data processing, determination of whether currently-acquired fingerprint image data matches previously-obtained fingerprint image data (such as fingerprint image data obtained during an enrollment process), etc.

In some examples, the memory system 108 may include one or more memory devices, such as one or more RAM devices, ROM devices, etc. In some implementations, the memory system 108 may include one or more computer-readable media, storage media and/or storage media. Computer-readable media include both computer storage media and communication media including any medium that may be enabled to transfer a computer program from one place to another. Storage media may be any available media that may be accessed by a computer. In some examples, the memory system 108 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

In some examples, the apparatus 101 includes a display system 110, which may include one or more displays. In some examples, the display system 110 may be, or may include, a light-emitting diode (LED) display, such as an organic light-emitting diode (OLED) display. In some such examples, the display system 110 may include layers, which may be referred to collectively as a "display stack."

In some implementations, the apparatus 101 may include a microphone system 112. The microphone system 112 may include one or more microphones, one or more types of microphones, or combinations thereof.

According to some implementations, the apparatus 101 may include an loudspeaker system 114. The loudspeaker system 114 may include one or more loudspeakers, one or more types of loudspeakers, or combinations thereof.

In some implementations, the apparatus 101 may include a gesture sensor system 116. The gesture sensor system 116 may be, or may include, an ultrasonic gesture sensor system, an optical gesture sensor system or any other suitable type of gesture sensor system.\

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, a watch, an armband, a wristband, a ring, a headband, an earbud or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

According to some implementations, the control system 106 may be configured to control the fingerprint sensor system 102 to scan a portion of a user's digit on a surface of the apparatus 101. In some implementations, the control system 106 may be configured to obtain, from the fingerprint sensor system 102, current A-line data and current ultrasonic fingerprint image data corresponding to reflections of ultrasonic waves from a target object. According to some implementations, the control system 106 may be configured to obtain, from a memory, previously-obtained A-line data and previously-obtained ultrasonic fingerprint image data that were previously obtained from an authorized user, for example during a fingerprint enrollment process.

In some implementations, the control system 106 may be configured to use A-line data from previous fingerprint authentication attempts to provide an improved false acceptance ratio (FAR), which corresponds to instances in which a fingerprint match is determined when the matching fingerprint is not obtained from an authorized user's finger. According to some implementations, the control system 106 may be configured to provide finger detection and device activation functionality based on A-line data, for example when a touch sensor system is in a low-power or "sleep" mode.

In some implementations, the control system 106 may be configured to estimate, based at least in part on the current A-line data, the previously-obtained A-line data, the current ultrasonic fingerprint image data and the previously-obtained ultrasonic fingerprint image data, whether the target object is a finger of the authorized user. The estimation may, in some examples, involve an anti-spoofing process that is based, at least in part, on the current A-line data and the previously-obtained A-line data. The estimation may involve a fingerprint authentication process that is based, at least in part, on the current ultrasonic fingerprint image data and the previously-obtained ultrasonic fingerprint image data.

According to some implementations, the control system 106 may be configured to implement one or more neural networks configured to perform the anti-spoofing process. In some such implementations, the control system 106 may be configured to calculate A-line features and to provide the A-line features to the neural network.

Figure 2:
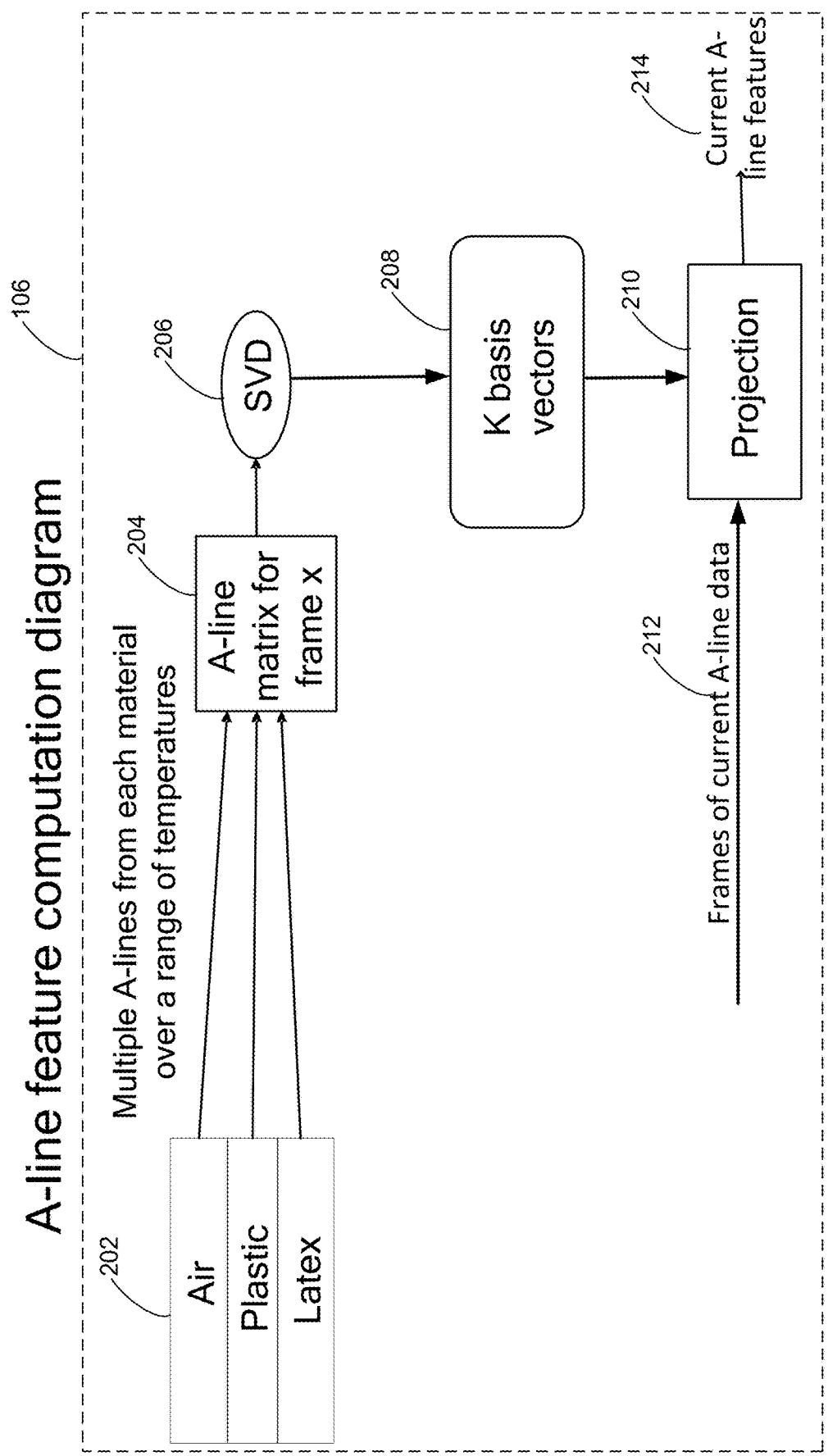
FIG. 2 shows examples of blocks that may be involved in calculating A-line features.

FIG. 2 shows examples of blocks that may be involved in calculating A-line features. According to this example, the A-line features are calculated by an instance of the control system 106 of FIG. 1C. As with other methods disclosed herein, alternative examples of calculating A-line features may include more, fewer or different blocks than indicated. Moreover, the operations of some disclosed methods are not necessarily performed in the order indicated. In some implementations, one or more blocks may be performed concurrently.

In this example, the calibration database 202 includes A-line samples obtained through different materials, which were also obtained at different temperatures. According to this example, the materials include air, one or more types of plastic (which may include Ecoflex™ material in some examples) and latex. In other examples, the materials may include glass or other materials commonly used for display cover layers, including protective layers, materials used in cellular telephone display stacks, etc. According to one example, the A-lines were obtained when the materials were at temperatures ranging from 20 degrees to 30 degrees Celsius. Other examples may involve different temperature ranges, such as lower or higher temperature ranges.

According to this example, the control system 106 is configured to select A-lines from the calibration database 202 corresponding to multiple temperature values for each material and to aggregate the selected A-lines into the A-line matrix 204. In one example, the calibration database 202 includes A-line data corresponding to 1420 A-line signals obtained through each of 12 different materials. Other calibration database examples may include A-line data corresponding to more or fewer materials, more or fewer A-line signals, or combinations thereof. In this example, the control system is configured to produce an instance of the A-line matrix 204 for each A-line frame. In this example, the control system 106 is configured to implement a singular value decomposition (SVD) operation 206 on the A-line matrix 204, to produce k basis vectors 208 for each A-line frame. According to this example, the k basis vectors 208 are essentially principal components, so the SVD operation 206 may be regarded as a principal component analysis (PCA) operation.

In this example, the control system 106 is configured to implement a projection operation 210 involving the k basis vectors 208 and a frame of current A-line data. The "current" A-line data may, for example, be obtained in addition to fingerprint image data during a current fingerprint authentication attempt. In some examples, the time at which the current A-line data are obtained and the time at which the current fingerprint image data are obtained may be separated by a relatively short time interval, such as tens of milliseconds, hundreds of milliseconds, etc. One frame of A-line data may, for example, correspond to a particular transmission and reception configuration. The particular transmission and reception configuration of the frame may, for example, correspond to a particular peak transmission frequency, a particular number of transmitted cycles, a particular receiver gain, a particular reception time window, or combinations thereof. According to this example, the projection operation 210 produces k, scalar, current A-line features 214 for each frame of the current A-line data. In some examples, the projection operation 210 may involve computing a dot product between the k basis vectors 208 and a vector representing a frame of current A-line data, to produce k numbers, which is the current A-line features 214.

Figure 3:
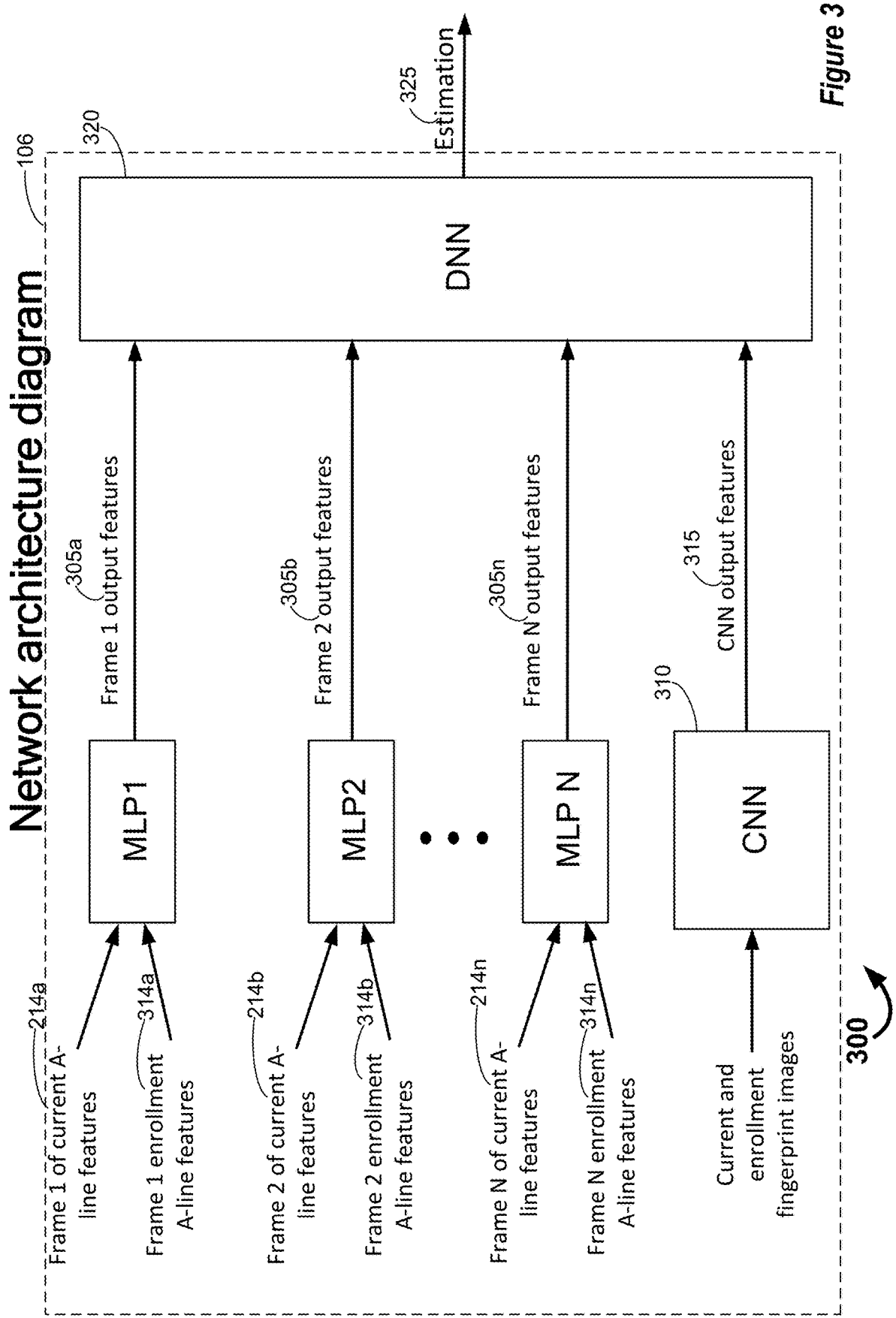
FIG. 3 shows an example of neural network architecture for performing an anti-spoofing process that is based, in part, on A-line data.

FIG. 3 shows an example of neural network architecture for performing an anti-spoofing process that is based, in part, on A-line data. In this example, the system 300 is implemented by an instance of the control system 106 of FIG. 1C. As with other figures disclosed herein, alternative examples may include more, fewer or different blocks than indicated in FIG. 3.

According to this example, the system 300 includes multilayer perceptron (MLPs) 1 through N, each of which is configured to provide one of the output features 305a through 305n, respectively, to the deep neural network (DNN) 320. In the example shown in FIG. 3, each of the output features 305a through 305n correspond to a particular frame of current A-line data and a particular frame of previously-obtained A-line data. In this example, each the MLPs receives as input an instance of the current A-line features 214 that were described with reference to FIG. 2. According to this example, MLP1 receives as input current A-line features 214a, corresponding to a first frame of current A-line data, MLP2 receives as input current A-line features 214b, corresponding to a second frame of current A-line data, and so on. MLPN receives as input current A-line features 214*n*, corresponding to the last frame of current A-line data. In some examples, N and may equal 10, 15, 20, etc.

According to this example, each the MLPs also receives as input A-line features corresponding to a frame of previously-obtained A-line data. In this example, the previously-obtained A-line data were obtained during an enrollment process. According to this example, MLP1 receives as input enrollment A-line features 314*a*, corresponding to a first frame of enrollment A-line data, MLP2 receives as input enrollment A-line features 314*b*, corresponding to a second frame of enrollment A-line data, and so on. MLPN receives as input enrollment A-line features 314*n*, corresponding to the last frame of enrollment A-line data. In some examples, the enrollment A-line features 314*a*-314*n* may have been calculated as described with reference to FIG. 2.

In this example, the system 300 includes convolutional neural network (CNN) 310, which is configured to provide CNN output features 315 to the DNN 320 corresponding to currently-obtained fingerprint image data and previously-obtained fingerprint image data. According to this example, the previously-obtained fingerprint image data were obtained during an enrollment process. The currently-obtained fingerprint image data may be obtained during a current fingerprint-based authentication attempt.

According to this example, the DNN 320 is configured to provide an estimation 325 of whether or not a target object from which the currently-obtained A-line data and the currently-obtained fingerprint image data were obtained is a finger of an authorized user. In this example, the estimation 325 is based on features representing time-domain data—each of which corresponds to a frame of A-line data—and features representing spatial data. In this example, the features representing spatial data are representations of the currently-obtained fingerprint image data and previously-obtained fingerprint image data.

In some alternative examples, the previously-obtained fingerprint image data, the previously-obtained A-line data, or both, may not have been obtained during an initial enrollment process. In some examples, the control system 106 may be configured for updating a database of originally-obtained enrollment data as a user uses the apparatus 101 over time. It may be beneficial to update a database of originally-obtained enrollment data due to various factors, such as changes in one or more of the user's fingerprints due to scarring, callousing, changing humidity conditions, etc. This updating process may be referred to herein as "adaptive enrollment."

Figure 4:
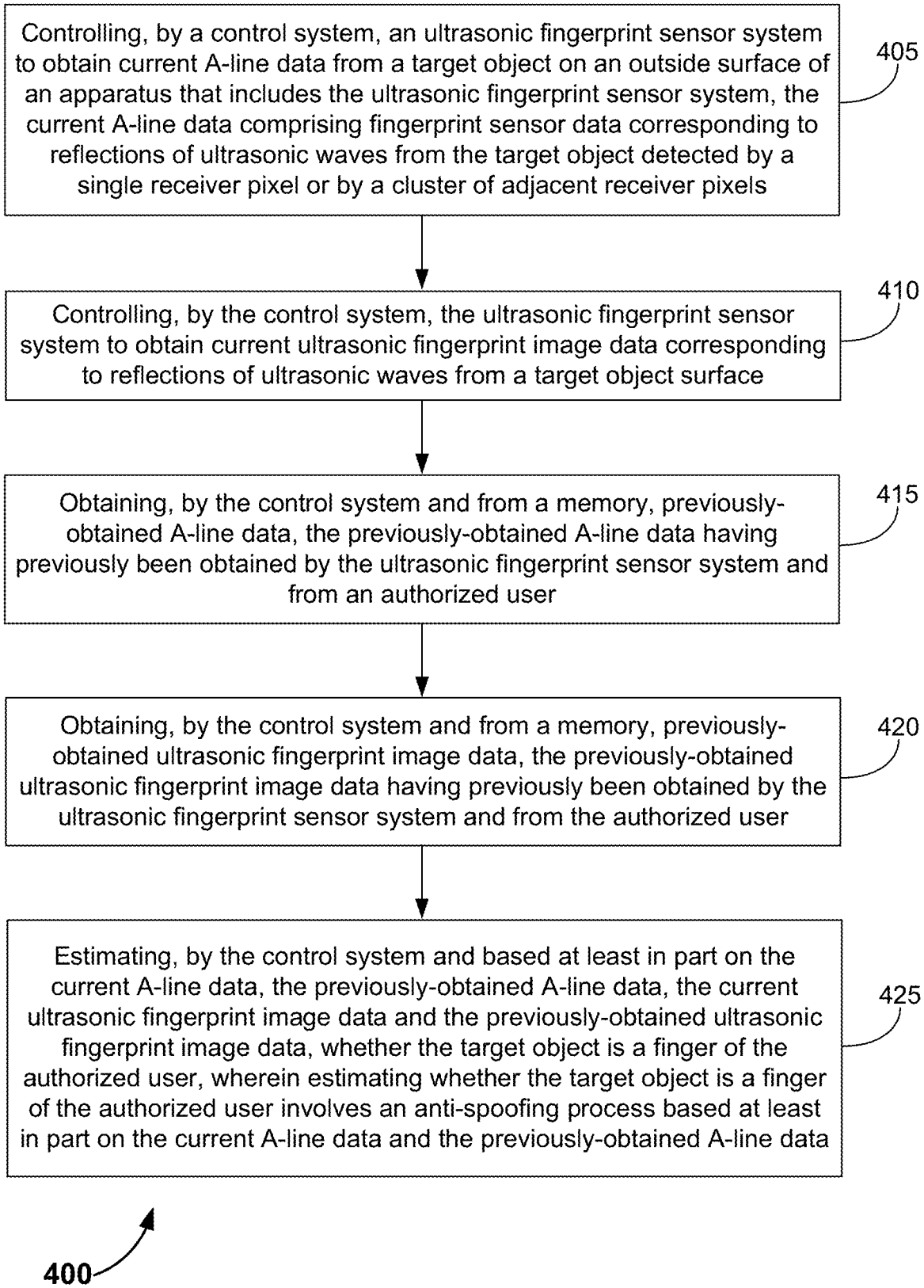
FIG. 4 is a flow diagram that presents examples of operations according to some disclosed methods.

FIG. 4 is a flow diagram that presents examples of operations according to some disclosed methods. The blocks of FIG. 4 may be performed by an apparatus that includes at least an ultrasonic fingerprint sensor system and a control system. The blocks of FIG. 4 may, for example, be performed by the apparatus 101 of FIG. 1C or by a similar apparatus. For example, in some implementations the control system 106 of FIG. 1C may be configured to perform, at least in part, the operations that are described herein with reference to FIG. 4. In some examples, the apparatus may be a mobile device, such as a cellular telephone. However, in other examples, the apparatus may be another type of device, such as a tablet, a laptop, an automobile or component thereof, a door access control device, a wearable device, etc. As with other methods disclosed herein, the methods outlined in FIG. 4 may include more or fewer blocks than indicated. Moreover, the blocks of methods disclosed herein are not necessarily performed in the order indicated. In some alternative examples, block 410 may be performed before block 405, block 415 may be performed before 420, or both. According to some alternative examples, there may be one or more additional instances of block 405, block 410, or both. In some alternative examples, there may be additional instances of blocks 420 and 425. In some implementations, one or more blocks may be performed concurrently.

According to this example, method 400 involves controlling a fingerprint sensor system. In this example, block 405 involves controlling, by a control system, an ultrasonic fingerprint sensor system to obtain current A-line data from a target object on an outside surface of an apparatus that includes the ultrasonic fingerprint sensor system. According to this example, the current A-line data includes fingerprint sensor data corresponding to reflections of ultrasonic waves from the target object detected by a single receiver pixel or by a cluster of adjacent receiver pixels. In some examples, the control system 106 of FIG. 1C may control the fingerprint sensor system 102 to obtain the current A-line data.

In this example, block 410 involves controlling, by the control system, the ultrasonic fingerprint sensor system to obtain current ultrasonic fingerprint image data corresponding to reflections of ultrasonic waves from a target object surface. According to this example, block 415 involves obtaining, by the control system and from a memory, previously-obtained A-line data. In this example, the previously-obtained A-line data was previously obtained by the ultrasonic fingerprint sensor system and from an authorized user.

According to this example, block 420 involves obtaining, by the control system and from a memory, previously-obtained ultrasonic fingerprint image data. In this example, the previously-obtained ultrasonic fingerprint image data were previously obtained by the ultrasonic fingerprint sensor system and from the authorized user. In some examples, the previously-obtained A-line data, the previously-obtained ultrasonic fingerprint image data, or both, may have been obtained during an enrollment process, such as an initial enrollment process or an adaptive enrollment process. According to some examples, the previously-obtained A-line data may correspond with the previously-obtained ultrasonic fingerprint image data. For example, the previously-obtained A-line data and the previously-obtained ultrasonic fingerprint image data may have been obtained during the same enrollment process.

In this example, block 425 involves estimating, by the control system and based at least in part on the current A-line data, the previously-obtained A-line data, the current ultrasonic fingerprint image data and the previously-obtained ultrasonic fingerprint image data, whether the target object is a finger of the authorized user. According to this example, estimating whether the target object is a finger of the authorized user involves an anti-spoofing process based at least in part on the current A-line data and the previously-obtained A-line data. However, some alternative examples of method may not involve an anti-spoofing process. In some examples, estimating whether the target object is a finger of the authorized user may involve a fingerprint authentication process based at least in part on the current ultrasonic fingerprint image data and the previously-obtained ultrasonic fingerprint image data. For example, the authentication process may involve extracting current fingerprint minutiae from the current ultrasonic fingerprint image data and comparing the current fingerprint minutiae with fingerprint minutiae extracted from previously-obtained ultrasonic fingerprint image data.

Some disclosed examples involve using A-line data from previous fingerprint authentication attempts to provide an improved false acceptance ratio (FAR), which corresponds to instances in which a fingerprint match is determined when the matching fingerprint is not obtained from an authorized user's finger. Such examples may provide improved biometric security for instances in which a live finger from an unauthorized user is presented for a fingerprint authentication attempt. In some instances, incorporating A-line data into a fingerprint authentication process may improve the FAR while maintaining the False Rejection Ratio at approximately the same level as when A-line data is not incorporated into the fingerprint authentication process. In some examples, incorporating A-line data into a fingerprint authentication process may improve the FAR by a factor of ten.

According to some examples, the control system may be configured to implement one or more neural networks that are configured to perform one or more disclosed methods, including but not limited to the disclosed anti-spoofing processes. In some examples, the one or more neural networks may include a deep neural network (DNN). According to some examples, the one or more neural networks may include a plurality of multilayer perceptron (MLPs), each of which is configured to provide output features to the DNN corresponding to a frame of current A-line data and a frame of previously-obtained A-line data. The one or more neural networks may, in some examples, be as described above with reference to FIG. 3.

In some examples, method 400 may involve determining current A-line features corresponding to frames of current A-line data and determining previously-obtained A-line features corresponding to frames of previously-obtained A-line data. In some such examples, determining the current A-line features and the previously-obtained A-line features may be based, at least in part, on output of a singular value decomposition (SVD) process. According to some examples, inputs to the SVD process may include A-line data corresponding to a plurality of different materials. In some examples, inputs to the SVD process may include A-line data obtained when each material of the plurality of different materials was at a plurality of different temperatures.

Figure 5:
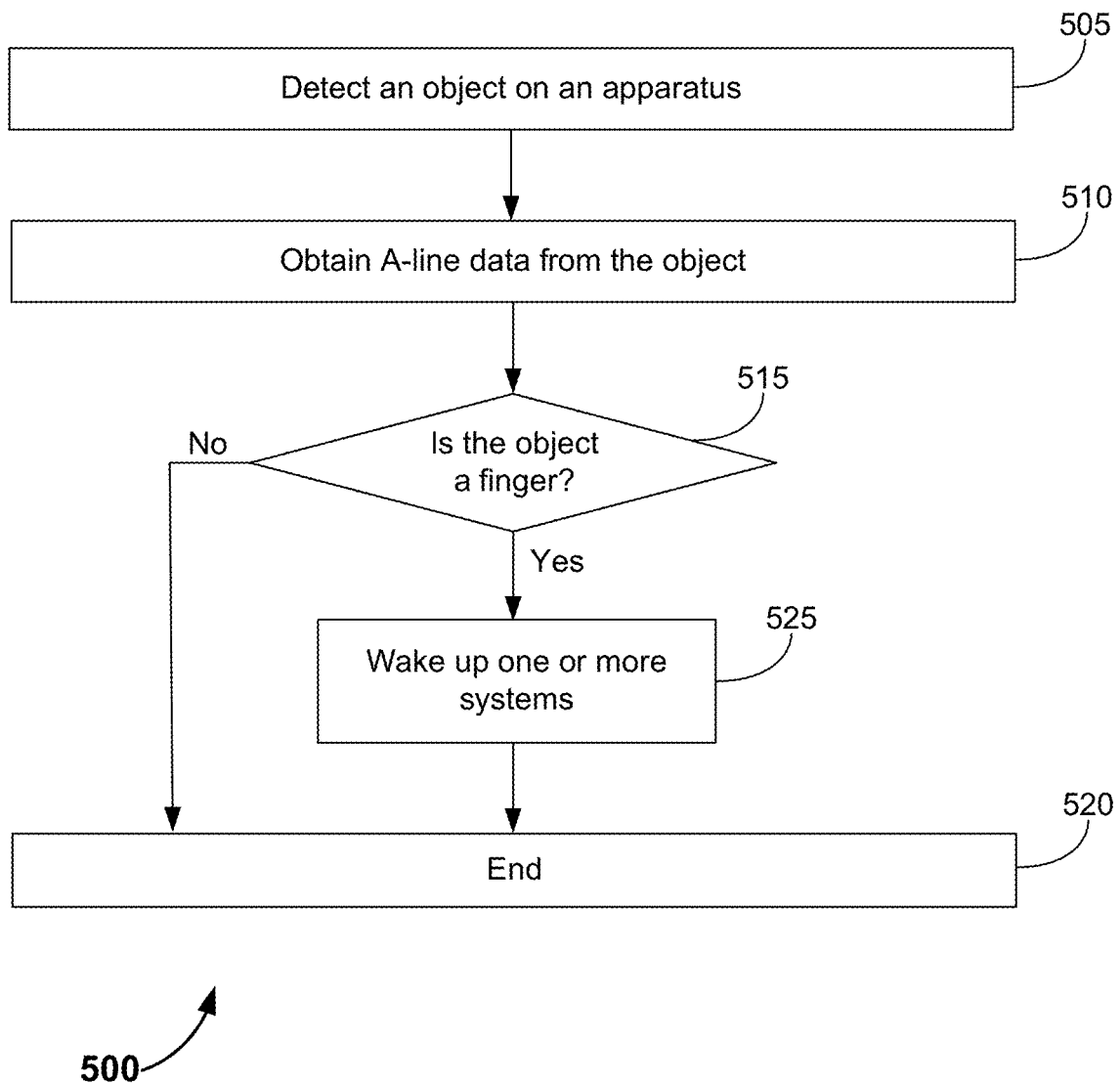
FIG. 5 is a flow diagram that presents examples of operations according to some alternative disclosed methods.

FIG. 5 is a flow diagram that presents examples of operations according to some alternative disclosed methods. The blocks of FIG. 5 may be performed by an apparatus that includes at least an ultrasonic fingerprint sensor system and a control system. The blocks of FIG. 5 may, for example, be performed by the apparatus 101 of FIG. 1C or by a similar apparatus. As with other methods disclosed herein, the methods outlined in FIG. 5 may include more or fewer blocks than indicated. Moreover, the blocks of methods disclosed herein are not necessarily performed in the order indicated. In some implementations, one or more blocks may be performed concurrently.

In this example, block 505 involves detecting an object on an apparatus. According to some examples, block 505 may involve detecting a force caused by the object on a surface of the apparatus that corresponds with an active area of an ultrasonic fingerprint sensor system. In some examples, block 505 may involve detecting the object on the apparatus when a touch sensor system of the apparatus is in a low-power or "sleep" mode. According to some examples, block 505 may involve detecting the force when the ultrasonic fingerprint sensor system is in a low-power mode, or when an ultrasonic transmitter portion of the ultrasonic fingerprint sensor system is in an inactive or "off" state. In some such examples, the force may be detected due to the piezoelectric effect of one or more materials included in the ultrasonic fingerprint sensor system, by sensing a voltage change caused by the electrical energy produced by the mechanical energy corresponding to the applied force.

According to this example, block 510 involves obtaining A-line data from the object. Block 510 may involve a control system controlling the ultrasonic fingerprint sensor system to obtain the A-line data via a single ultrasonic receiver pixel, or via two or more adjacent ultrasonic receiver pixels.

In this example, block 515 involves determining, based on the A-line data, whether the object is a finger. The presence of multiple reflections in the A-line data, such as the reflections shown in FIG. 1A, would indicate that the target object is not, for example, a solid piece of silicone rubber or other such material that may sometimes be used for spoofing. According to this example, if it is determined in block 515 that the object is not a finger, the process ends in block 520.

However, if it is determined in block 515 that the object is a finger, the process continues to block 525. Here, block 525 involves waking up one or more systems of the device. The one or more systems may, for example, include a touch sensor system. In some examples, block 525 may involve turning on a display screen. Alternatively, or additionally, in some examples block 525 may involve initiating a fingerprint scan.

Implementation examples are described in the following numbered clauses:

1. An apparatus, including: an ultrasonic fingerprint sensor system including a plurality of receiver pixels; and a control system configured for electrical communication with the ultrasonic fingerprint sensor system, the control system being further configured to: control the ultrasonic fingerprint sensor system to obtain current A-line data from a target object on an outside surface of the apparatus, the current A-line data including fingerprint sensor data corresponding to reflections of ultrasonic waves from the target object detected by a single receiver pixel or by a cluster of adjacent receiver pixels; control the ultrasonic fingerprint sensor system to obtain current ultrasonic fingerprint image data corresponding to reflections of ultrasonic waves from a target object surface; obtain, from a memory, previously-obtained A-line data, the previously-obtained A-line data having previously been obtained by the ultrasonic fingerprint sensor system and from an authorized user; obtain, from a memory, previously-obtained ultrasonic fingerprint image data, the previously-obtained ultrasonic fingerprint image data having previously been obtained by the ultrasonic fingerprint sensor system and from the authorized user; and estimate, based at least in part on the current A-line data, the previously-obtained A-line data, the current ultrasonic fingerprint image data and the previously-obtained ultrasonic fingerprint image data, whether the target object is a finger of the authorized user.

2. The apparatus of clause 1, where estimating whether the target object is a finger of the authorized user involves a fingerprint authentication process based at least in part on the current ultrasonic fingerprint image data and the previously-obtained ultrasonic fingerprint image data.

3. The apparatus of clause 1 or clause 2, where estimating whether the target object is a finger of the authorized user involves an anti-spoofing process 4. The apparatus of clause 3, where the control system is configured to implement one or more neural networks configured to perform the anti-spoofing process.
5. The apparatus of clause 4, where the one or more neural networks include a deep neural network (DNN).
6. The apparatus of clause 5, where the one or more neural networks include a plurality of multilayer perceptron (MLPs), each of which is configured to provide output features to the DNN corresponding to a frame of current A-line data and a frame of previously-obtained A-line data.
7. The apparatus of clause 6, where the control system is further configured to determine current A-line features corresponding to frames of current A-line data and previously-obtained A-line features corresponding to frames of previously-obtained A-line data.
8. The apparatus of clause 7, where the control system is further configured to determine the current A-line features and the previously-obtained A-line features based, at least in part, on output of a singular value decomposition (SVD) process.
9. The apparatus of clause 8, where inputs to the SVD process include A-line data corresponding to a plurality of different materials.
10. The apparatus of clause 9, where inputs to the SVD process include A-line data obtained when each material of the plurality of different materials was at a plurality of different temperatures.
11. The apparatus of any one of clauses 1-10, where the previously-obtained A-line data comprises enrollment A-line data, the enrollment A-line data having previously been obtained by the ultrasonic fingerprint sensor system and from the authorized user during a user enrollment process.
12. The apparatus of any one of clauses 1-11, where the previously-obtained ultrasonic fingerprint image data comprises enrollment ultrasonic fingerprint image data, the enrollment ultrasonic fingerprint image data having previously been obtained by the ultrasonic fingerprint sensor system and from the authorized user during a user enrollment process.
13. The apparatus of any one of clauses 1-12, where the previously-obtained A-line data corresponds with the previously-obtained ultrasonic fingerprint image data.
14. The apparatus of clause 13, where the previously-obtained A-line data were obtained when the previously-obtained ultrasonic fingerprint image data were obtained.
15. A method, including: controlling, by a control system, an ultrasonic fingerprint sensor system to obtain current A-line data from a target object on an outside surface of an apparatus that includes the ultrasonic fingerprint sensor system, the current A-line data including fingerprint sensor data corresponding to reflections of ultrasonic waves from the target object detected by a single receiver pixel or by a cluster of adjacent receiver pixels; controlling, by the control system, the ultrasonic fingerprint sensor system to obtain current ultrasonic fingerprint image data corresponding to reflections of ultrasonic waves from a target object surface; obtaining, by the control system and from a memory, previously-obtained A-line data, the previously-obtained A-line data having previously been obtained by the ultrasonic fingerprint sensor system and from an authorized user; obtaining, by the control system and from a memory, previously-obtained ultrasonic fingerprint image data, the previously-obtained ultrasonic fingerprint image data having previously been obtained by the ultrasonic fingerprint sensor system and from the authorized user; and estimating, by the control system and based at least in part on the current A-line data, the previously-obtained A-line data, the current ultrasonic fingerprint image data and the previously-obtained ultrasonic fingerprint image data, whether the target object is a finger of the authorized user.
16. The method of clause 15, where estimating whether the target object is a finger of the authorized user involves a fingerprint authentication process based at least in part on the current ultrasonic fingerprint image data and the previously-obtained ultrasonic fingerprint image data.
17. The method of clause 15 or clause 16, where estimating whether the target object is a finger of the authorized user involves an anti-spoofing process
18. The method of clause 17, where the control system is configured to implement one or more neural networks configured to perform the anti-spoofing process.
19. The method of clause 18, where the one or more neural networks include a deep neural network (DNN).
20. The method of clause 19, where the one or more neural networks include a plurality of multilayer perceptron (MLPs), each of which is configured to provide output features to the DNN corresponding to a frame of current A-line data and a frame of previously-obtained A-line data.
21. The method of clause 20, further including determining current A-line features corresponding to frames of current A-line data and previously-obtained A-line features corresponding to frames of previously-obtained A-line data.
22. The method of clause 21, further including determining the current A-line features and the previously-obtained A-line features based, at least in part, on output of a singular value decomposition (SVD) process.
23. The method of clause 22, where inputs to the SVD process include A-line data corresponding to a plurality of different materials.
24. The method of clause 23, where inputs to the SVD process include A-line data obtained when each material of the plurality of different materials was at a plurality of different temperatures.
25. The method of any one of clauses 15-24, where the previously-obtained A-line data comprises enrollment A-line data, the enrollment A-line data having previously been obtained by the ultrasonic fingerprint sensor system and from the authorized user during a user enrollment process.
26. The method of any one of clauses 15-25, where the previously-obtained ultrasonic fingerprint image data comprises enrollment ultrasonic fingerprint image data, the enrollment ultrasonic fingerprint image data having previously been obtained by the ultrasonic fingerprint sensor system and from the authorized user during a user enrollment process.
27. An apparatus, including: an ultrasonic fingerprint sensor system including a plurality of receiver pixels; and control means for: controlling the ultrasonic fingerprint sensor system to obtain current A-line data from a target object on an outside surface of the apparatus, the current A-line data including fingerprint sensor data corresponding to reflections of ultrasonic waves from the target object detected by a single receiver pixel or by a cluster of adjacent receiver pixels; controlling the ultrasonic fingerprint sensor system to obtain current ultrasonic fingerprint image data corresponding to reflections of ultrasonic waves from a target object surface; obtaining, from a memory, previously-obtained A-line data, the previously-obtained A-line data having previously been obtained by the ultrasonic fingerprint sensor system and from an authorized user; obtaining, from a memory, previously-obtained ultrasonic fingerprint image data, the previously-obtained ultrasonic fingerprint image data having previously been obtained by the ultrasonic fingerprint sensor system and from the authorized user; and estimating, based at least in part on the current A-line data, the previously-obtained A-line data, the current ultrasonic fingerprint image data and the previously-obtained ultrasonic fingerprint image data, whether the target object is a finger of the authorized user.

28. The apparatus of clause 27, where estimating whether the target object is a finger of the authorized user involves an anti-spoofing process.

29. One or more non-transitory media having instructions stored thereon for controlling one or more devices to perform a method, the method including: controlling, by a control system, an ultrasonic fingerprint sensor system to obtain current A-line data from a target object on an outside surface of an apparatus that includes the ultrasonic fingerprint sensor system, the current A-line data including fingerprint sensor data corresponding to reflections of ultrasonic waves from the target object detected by a single receiver pixel or by a cluster of adjacent receiver pixels; controlling, by the control system, the ultrasonic fingerprint sensor system to obtain current ultrasonic fingerprint image data corresponding to reflections of ultrasonic waves from a target object surface; obtaining, by the control system and from a memory, previously-obtained A-line data, the previously-obtained A-line data having previously been obtained by the ultrasonic fingerprint sensor system and from an authorized user; obtaining, by the control system and from a memory, previously-obtained ultrasonic fingerprint image data, the previously-obtained ultrasonic fingerprint image data having previously been obtained by the ultrasonic fingerprint sensor system and from the authorized user; and estimating, by the control system and based at least in part on the current A-line data, the previously-obtained A-line data, the current ultrasonic fingerprint image data and the previously-obtained ultrasonic fingerprint image data, whether the target object is a finger of the authorized user.

30. The one or more non-transitory media of clause 29, where estimating whether the target object is a finger of the authorized user involves an anti-spoofing process.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus, comprising:
   an ultrasonic fingerprint sensor system including a plurality of receiver pixels;
   a memory system; and
   a control system configured for electrical communication with the ultrasonic fingerprint sensor system, the control system being further configured to:
      control the ultrasonic fingerprint sensor system to obtain current A-line data from a target object on an outside surface of the apparatus, the current A-line data comprising fingerprint sensor data corresponding to reflections of ultrasonic waves from the target object detected by a single receiver pixel or by a cluster of adjacent receiver pixels;
      control the ultrasonic fingerprint sensor system to obtain current ultrasonic fingerprint image data corresponding to reflections of ultrasonic waves from a target object surface;
      obtain, from the memory system, previously-obtained A-line data, the previously-obtained A-line data having previously been obtained by the ultrasonic fingerprint sensor system and from an authorized user;
      obtain, from the memory system, previously-obtained ultrasonic fingerprint image data, the previously-obtained ultrasonic fingerprint image data having previously been obtained by the ultrasonic fingerprint sensor system and from the authorized user; and
      estimate, based at least in part on the current A-line data, the previously-obtained A-line data, the current ultrasonic fingerprint image data and the previously-obtained ultrasonic fingerprint image data, whether the target object is a finger of the authorized user, wherein estimating whether the target object is a finger of the authorized user involves an anti-spoofing process performed by one or more neural networks including a deep neural network (DNN) and a plurality of multilayer perceptrons (MLPs), each of the MLPs being configured to provide output features to the DNN corresponding to a frame of current A-line data and a frame of previously-obtained A-line data.

2. The apparatus of claim 1, wherein estimating whether the target object is a finger of the authorized user involves a fingerprint authentication process based at least in part on the current ultrasonic fingerprint image data and the previously-obtained ultrasonic fingerprint image data.

3. The apparatus of claim 1, wherein the control system is further configured to determine current A-line features corresponding to frames of current A-line data and previously-obtained A-line features corresponding to frames of previously-obtained A-line data.

4. The apparatus of claim 3, wherein the control system is further configured to determine the current A-line features and the previously-obtained A-line features based, at least in part, on output of a singular value decomposition (SVD) process.

5. The apparatus of claim 4, wherein inputs to the SVD process include A-line data corresponding to a plurality of different materials.

6. The apparatus of claim 5, wherein inputs to the SVD process include A-line data obtained when each material of the plurality of different materials was at a plurality of different temperatures.

7. The apparatus of claim 1, wherein the previously-obtained A-line data comprises enrollment A-line data, the enrollment A-line data having previously been obtained by the ultrasonic fingerprint sensor system and from the authorized user during a user enrollment process.

8. The apparatus of claim 1, wherein the previously-obtained ultrasonic fingerprint image data comprises enrollment ultrasonic fingerprint image data, the enrollment ultrasonic fingerprint image data having previously been obtained by the ultrasonic fingerprint sensor system and from the authorized user during a user enrollment process.

9. The apparatus of claim 1, wherein the previously-obtained A-line data corresponds with the previously-obtained ultrasonic fingerprint image data.

10. The apparatus of claim 9, wherein the previously-obtained A-line data were obtained when the previously-obtained ultrasonic fingerprint image data were obtained.

11. A method, comprising:
    controlling, by a control system, an ultrasonic fingerprint sensor system to obtain current A-line data from a target object on an outside surface of an apparatus that includes the ultrasonic fingerprint sensor system, the current A-line data comprising fingerprint sensor data corresponding to reflections of ultrasonic waves from the target object detected by a single receiver pixel or by a cluster of adjacent receiver pixels;

controlling, by the control system, the ultrasonic fingerprint sensor system to obtain current ultrasonic fingerprint image data corresponding to reflections of ultrasonic waves from a target object surface;

obtaining, by the control system and from a memory system, previously-obtained A-line data, the previously-obtained A-line data having previously been obtained by the ultrasonic fingerprint sensor system and from an authorized user;

obtaining, by the control system and from the memory system, previously-obtained ultrasonic fingerprint image data, the previously-obtained ultrasonic fingerprint image data having previously been obtained by the ultrasonic fingerprint sensor system and from the authorized user; and estimating, by the control system and based at least in part on the current A-line data, the previously-obtained A-line data, the current ultrasonic fingerprint image data and the previously-obtained ultrasonic fingerprint image data, whether the target object is a finger of the authorized user, wherein estimating whether the target object is a finger of the authorized user involves an anti-spoofing process performed by one or more neural networks including a deep neural network (DNN) and a plurality of multilayer perceptrons (MLPs), each of the MLPs being configured to provide output features to the DNN corresponding to a frame of current A-line data and a frame of previously-obtained A-line data.

12. The method of claim 11, wherein estimating whether the target object is a finger of the authorized user involves a fingerprint authentication process based at least in part on the current ultrasonic fingerprint image data and the previously-obtained ultrasonic fingerprint image data.

13. The method of claim 11, further comprising determining current A-line features corresponding to frames of current A-line data and previously-obtained A-line features corresponding to frames of previously-obtained A-line data.

14. The method of claim 13, further comprising determining the current A-line features and the previously-obtained A-line features based, at least in part, on output of a singular value decomposition (SVD) process.

15. The method of claim 14, wherein inputs to the SVD process include A-line data corresponding to a plurality of different materials.

16. The method of claim 15, wherein inputs to the SVD process include A-line data obtained when each material of the plurality of different materials was at a plurality of different temperatures.

17. The method of claim 11, wherein the previously-obtained A-line data comprises enrollment A-line data, the enrollment A-line data having previously been obtained by the ultrasonic fingerprint sensor system and from the authorized user during a user enrollment process.

18. The method of claim 11, wherein the previously-obtained ultrasonic fingerprint image data comprises enrollment ultrasonic fingerprint image data, the enrollment ultrasonic fingerprint image data having previously been obtained by the ultrasonic fingerprint sensor system and from the authorized user during a user enrollment process.

19. An apparatus, comprising:
an ultrasonic fingerprint sensor system including a plurality of receiver pixels;
a memory system; and
control means for:
controlling the ultrasonic fingerprint sensor system to obtain current A-line data from a target object on an outside surface of the apparatus, the current A-line data comprising fingerprint sensor data corresponding to reflections of ultrasonic waves from the target object detected by a single receiver pixel or by a cluster of adjacent receiver pixels;

controlling the ultrasonic fingerprint sensor system to obtain current ultrasonic fingerprint image data corresponding to reflections of ultrasonic waves from a target object surface;

obtaining, from the memory system, previously-obtained A-line data, the previously-obtained A-line data having previously been obtained by the ultrasonic fingerprint sensor system and from an authorized user;

obtaining, from the memory system, previously-obtained ultrasonic fingerprint image data, the previously-obtained ultrasonic fingerprint image data having previously been obtained by the ultrasonic fingerprint sensor system and from the authorized user; and estimating, based at least in part on the current A-line data, the previously-obtained A-line data, the current ultrasonic fingerprint image data and the previously-obtained ultrasonic fingerprint image data, whether the target object is a finger of the authorized user wherein estimating whether the target object is a finger of the authorized user involves an anti-spoofing process performed by one or more neural networks including a deep neural network (DNN) and a plurality of multilayer perceptrons (MLPs), each of the MLPs being configured to provide output features to the DNN corresponding to a frame of current A-line data and a frame of previously-obtained A-line data.

20. One or more non-transitory media having instructions stored thereon for controlling one or more devices to perform a method, the method comprising:
controlling, by a control system, an ultrasonic fingerprint sensor system to obtain current A-line data from a target object on an outside surface of an apparatus that includes the ultrasonic fingerprint sensor system, the current A-line data comprising fingerprint sensor data corresponding to reflections of ultrasonic waves from the target object detected by a single receiver pixel or by a cluster of adjacent receiver pixels;

controlling, by the control system, the ultrasonic fingerprint sensor system to obtain current ultrasonic fingerprint image data corresponding to reflections of ultrasonic waves from a target object surface;

obtaining, by the control system and from a memory system, previously-obtained A-line data, the previously-obtained A-line data having previously been obtained by the ultrasonic fingerprint sensor system and from an authorized user;

obtaining, by the control system and from the memory system, previously-obtained ultrasonic fingerprint image data, the previously-obtained ultrasonic fingerprint image data having previously been obtained by the ultrasonic fingerprint sensor system and from the authorized user; and estimating, by the control system and based at least in part on the current A-line data, the previously-obtained A-line data, the current ultrasonic fingerprint image data and the previously-obtained ultrasonic fingerprint image data, whether the target object is a finger of the authorized user, wherein estimating whether the target object is a finger of the authorized user involves an anti-spoofing process performed by one or more neural networks including a deep neural network (DNN) and a plurality of multilayer perceptrons (MLPs), each of the MLPs being configured to provide output features to the DNN corresponding to a frame of current A-line data and a frame of previously-obtained A-line data.

* * * * *